United States Patent
Xu et al.

(10) Patent No.: US 10,827,422 B1
(45) Date of Patent: Nov. 3, 2020

(54) INTELLIGENT STEERING METHOD AND SYSTEM FOR PRIVATE LTE AND 5G TELECOMMUNICATION NETWORKS

(71) Applicant: Syniverse Technologies, LLC, Tampa, FL (US)

(72) Inventors: Huiyue Xu, Tampa, FL (US); Edward Yau, Tseung Kwan O (HK); Deliang Qian, Tampa, FL (US); Zidan Lian, San Jose, CA (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/834,052

(22) Filed: Mar. 30, 2020

Related U.S. Application Data (60) Provisional application No. 62/935,021, filed on Nov. 13, 2019.

(51) Int. Cl.
*H04W 4/02* (2018.01)
*H04W 48/18* (2009.01)
*H04W 4/50* (2018.01)
*H04W 64/00* (2009.01)
*H04W 60/04* (2009.01)
*H04W 48/16* (2009.01)

(52) U.S. Cl.
CPC ............ *H04W 48/18* (2013.01); *H04W 4/50* (2018.02); *H04W 48/16* (2013.01); *H04W 60/04* (2013.01); *H04W 64/006* (2013.01)

(58) Field of Classification Search
CPC ......... H04W 48/18; H04W 4/50; H04W 4/60; H04W 8/18; H04W 8/183; H04W 36/0083; H04W 36/14; H04W 36/30; H04W 48/08; H04W 60/00; H04W 74/00; H04W 84/045; H04W 84/12; H04W 88/06; H04W 8/205; H04W 12/0023; H04W 12/06; H04W 24/00
See application file for complete search history.

(56) References Cited

U.S. PATENT DOCUMENTS

| | | | | |
|---|---|---|---|---|
| 2006/0293066 | A1* | 12/2006 | Edge | H04W 4/029 455/456.3 |
| 2007/0297364 | A1* | 12/2007 | Fagridas | H04W 40/242 370/331 |
| 2008/0037481 | A1* | 2/2008 | Chiang | H04L 12/66 370/338 |

(Continued)

*Primary Examiner* — Quan M Hua
(74) *Attorney, Agent, or Firm* — Andriy Lytvyn; Smith & Hopen, P.A.

(57) ABSTRACT

A method and system for steering a mobile device to a preferred network, such as a Private LTE network or a 5G network, in a scenario in which the coverage area of the preferred network overlaps the coverage area of a non-preferred network, such as a 3G or a 4G Public Land Mobile Network (PLMN). A preferred network list is provisioned into a SIM/eSIM module at the mobile device side. The mobile device periodically collects a set of values for attributes associated with a current location of the mobile device and reports the collected values to the Steering application, hosted at the network side. The Steering application detects whether the mobile device is within the coverage area of the preferred network and, if so, triggers the mobile device to perform network steering.

16 Claims, 10 Drawing Sheets

(56) References Cited

U.S. PATENT DOCUMENTS

| | | | | |
|---|---|---|---|---|
| 2008/0064393 A1* | 3/2008 | Oommen | ............. | H04W 48/18 455/432.1 |
| 2010/0173628 A1* | 7/2010 | Hosain | ................. | H04W 48/18 455/432.1 |
| 2010/0234021 A1* | 9/2010 | Ngai | ................... | H04W 36/385 455/433 |
| 2014/0073366 A1* | 3/2014 | Xing | ..................... | H04W 76/28 455/458 |
| 2018/0242110 A1* | 8/2018 | Suzuki | ................ | H04W 4/024 |
| 2020/0045599 A1* | 2/2020 | Bhardwaj | ............. | H04W 36/36 |

* cited by examiner

INTELLIGENT STEERING METHOD AND SYSTEM FOR PRIVATE LTE AND 5G TELECOMMUNICATION NETWORKS

PRIORITY CLAIM

This non-provisional application claims priority to a U.S. Provisional Application having Ser. No. 62/935,021 filed on Nov. 13, 2019.

BACKGROUND OF THE INVENTION

1. Field of the Invention

This invention relates generally to the field of telecommunication networks. More specifically, the invention pertains to a method for improving mobile network steering and traffic routing efficiency, such that a mobile device is steered to a preferred network in scenarios in which the coverage area of a preferred network, such as a Private Long Term Evolution (LTE) or 5G network, overlaps a coverage area of one or more non-preferred Public Land Mobile Networks (PLMN), including 3G and 4G networks.

2. Brief Description of the Related Art

Private LTE networks are emerging as a new type of telecommunication networks. Private LTE networks can be specifically configured to serve specific enterprises, including those in government and education sectors. Although private LTE networks use standards that are based on those adopted for public LTE networks, important differences exist between private and public LTE networks. Unlike public LTE networks, which are operated by traditional mobile operators within license spectrum, Private LTE networks can be operated by a third-party network providers using licensed, unlicensed, or shared spectrum. Moreover, Private LTE networks can be accessed only by specific mobile devices (such as an Internet of Things (IoT) device, a restricted employee device, etc.) for predefined business purposes. A Private LTE network can be isolated from the public network access and can be tailored for optimized network performance, increased secure control, independence, and flexibility. For these reasons, Private LTE networks have a wide array of potential applications, including enterprise connectivity, Industrial IoT, Smart City, Smart Transportation, etc.

Unlike PLMNs that can provide seamless and full coverage over a metropolitan or a wide geographic area, coverage areas of typical Private LTE networks are generally limited and often overlap with the geographic areas covered by one or more PLMNs. Along with the growth of the Private LTE networks and deployment of Citizens Broadband Radio Service (CBRS), the likelihood of overlapping Private LTE networks covering the same geographic area will increase. This problem presents a challenge for ensuring that moving mobile devices automatically register and use the correct cellular network and service. In scenarios, in which multiple cellular networks serve the same location, each network operator generally retains its own mobility management for security reasons.

Currently, to register within a PLMN, a mobile device scans for available PLMNs in its current geographic area. Once mobile device identifies and registers with a PLMN, the mobile device will not attempt to register with another cellular network unless one of the following conditions occurs: loss of the current network connection, user manually initiates a new network search/selection process, or the mobile device attempts to search/select a higher priority cellular network upon expiration of a predefined time period. Thus, generally, a mobile device registered with a PLMN will not become aware that a new cellular network with higher priority becomes available until the predefined time period expires, and, therefore, the mobile device may wait for an extensive period of time without switching to a more preferred cellular network.

Figure 1:
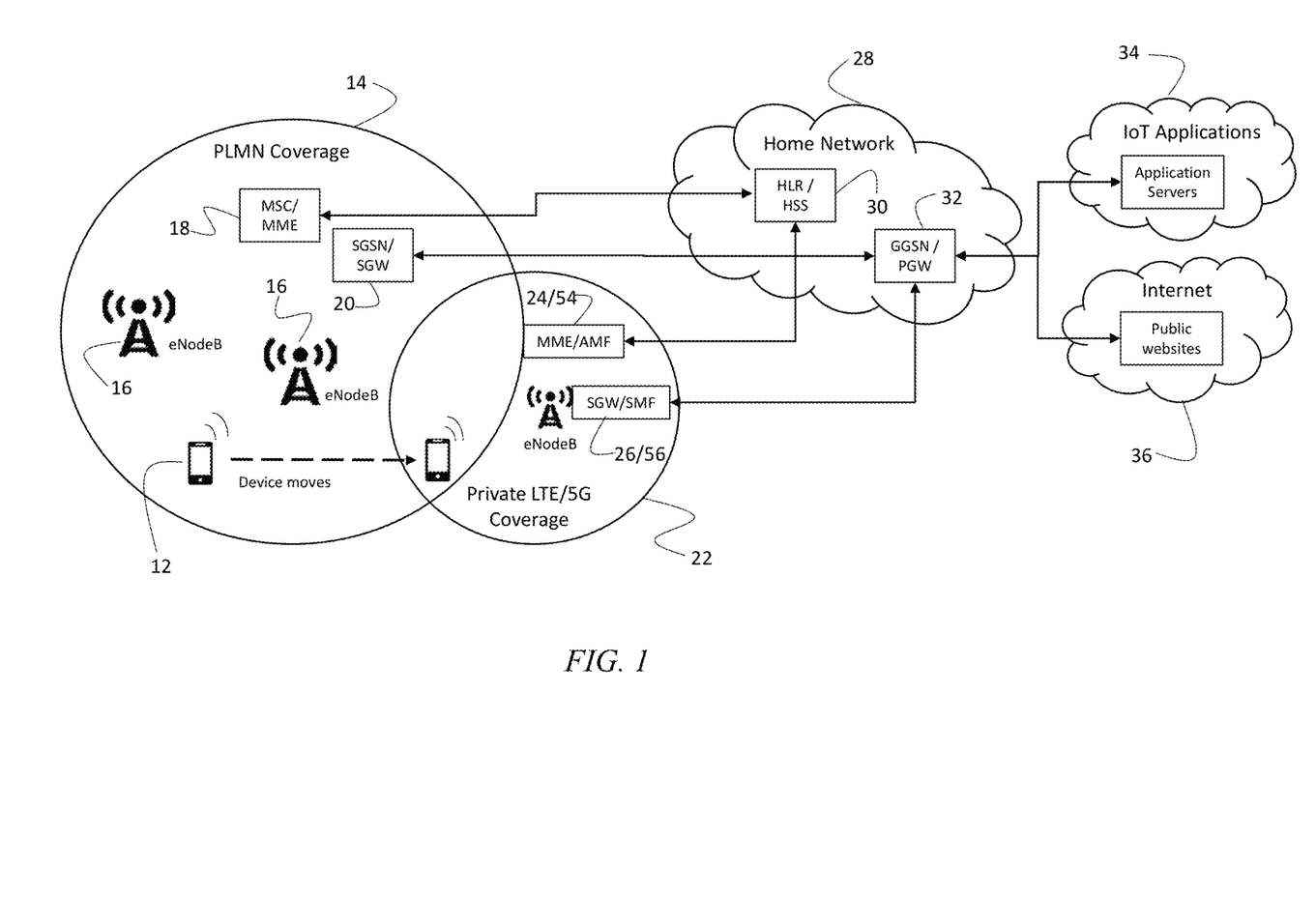
FIG. 1 is a block diagram schematically depicting the exemplary network architecture of one embodiment.

Unlike traditional mobile networks, which generally have extensive coverage over wide geographic areas, Private LTE networks are usually restricted to predefined locations, which may coincide with coverage areas of other mobile operator networks. This scheme generally works well for stationary mobile devices that can always be inside the coverage of the specific Private LTE network. However, providing seamless network connectivity for a mobile device that moves across multiple Private LTE and PLMN networks creates a challenge. For example, when a mobile device moves from a geographic location covered exclusively by a PLMN into a geographic location covered by both the PLMN and a Private LTE network (as depicted in FIG. 1), it is desirable for the mobile device to quickly and efficiently connect to the Private LTE network. However, as explained above, because the mobile device is already connected to the PLMN, a mobile device will not automatically switch from the PLMN to the Private LTE network until one of the following events occurs: the mobile device is outside of the public network coverage area, the user manually initiates registration with the Private LTE network, or a predefined time elapses.

Similar challenges are also pertinent to the emerging 5G networks. Because these networks are at the early deployment stages, the 5G coverage is limited to predefined geographic areas, which often overlap with the coverage areas of 3G and 4G networks. Thus, when a 5G-capable device moves into a geographic location having 5G network coverage, the 5G-capable device may remain connected to the 3G or 4G network and may fail to switch to the 5G network in a quick and efficient manner.

Thus, there exists an unresolved need for a method configured to improve mobile network steering and traffic routing efficiency by steering a mobile device to the preferred network in geographic locations concurrently covered by multiple networks including Private LTE networks, 5G networks, and PLMNs, such as 3G and 4G networks.

SUMMARY OF THE INVENTION

The invention provides a novel and non-obvious solution to the problem identified above. Instead of relying on the device-side process of conducting periodical network scanning, which is interruptive and power consuming, the invention provides a network-side solution that steers the mobile device to the preferred network based on the proximity of the mobile device to the preferred network.

In an embodiment, the invention pertains to a method of steering a mobile device to a preferred telecommunications network having a geographical coverage area at least partially coinciding with a coverage area of a non-preferred telecommunications network. A list containing identification information associated with the preferred telecommunications networks—e.g., mobile country codes (MCCs) and/or mobile network codes (MNCs)—is provisioned on a Subscriber Identity Module (SIM) card or a virtual SIM module (eSIM). A command is issued directing the mobile device to collect a set of values for attributes associated with a current location of the mobile device. In an embodiment, these values include one or more of the following: a longitude, a latitude, a MCC, MNC, cell identification, adjacent cell information, radio signal quality, and radio signal strength.

Next, the mobile device reports these values to a steering application, which is hosted on the home-network side. The steering application accesses a set of prestored attribute values associated with the geographical coverage area of the preferred network and compares prestored values against the set of values reported by the mobile device. The reporting function can be accomplished using unstructured supplementary service data (USSD) via SS7 or using Diameter signaling updates and GTP-C updates.

Based on this comparison, steering application determines whether the current location of the mobile device is within the geographical coverage area of the preferred network. If so, the steering application triggers a steering command. In an embodiment, the steering command is triggered as an over the air (OTA) message to the SIM/eSIM module. The steering command directs the mobile device to perform a network selection procedure based on the provisioned list of the preferred telecommunications networks. After the mobile device successfully attaches to the preferred communications network, the mobile device sends a confirmation that the mobile device is registered with the preferred telecommunications network.

Responsive to the confirmation that the mobile device is registered with the preferred network, the mobile device stops collecting the set of values for attributes associated with the current location of the mobile device. Furthermore, responsive to the confirmation that the mobile device is registered with the preferred network, the mobile device or a network application are triggered to initiate data exchange over the preferred telecommunications network.

In an embodiment, the command directing the mobile device to collect the set of values for attributes associated with the current location of the mobile device is issued periodically based on a predefined time period.

In an embodiment, if it is determined that the mobile device is outside the coverage area of the preferred telecommunications network, an expected time of arrival of the mobile device into the coverage area of the preferred network is calculated. Then, a command directing the mobile device to collect a new set of values for attributes associated with a new location of the mobile device is issued at the expected time of arrival into the coverage area of the preferred network. Furthermore, the mobile device may be configured to initiate reattachment procedure at the expected time of arrival to attach to the preferred network. The expected time of arrival of the mobile device may be calculated based on a distance between the current location of the mobile device and the coverage area of the preferred network and a movement speed of the mobile device.

In an embodiment, the preferred network may be a Private LTE network, a 5G network, or a Private 5G network.

In an embodiment, the command directing the mobile device to collect the set of values for attributes associated with a current location of the mobile device is issued by an application in a form of a software running on the mobile device or an applet running on an operating system of the SIM card or the virtual SIM module.

In an embodiment, the set of values for attributes associated with a current location of the mobile device is reported via SS7, Diameter, GTP, HTTP/2 signaling protocol, Internet TCP/IP protocol.

In an embodiment, when the mobile device leaves the coverage area of the preferred network, data payload exchange between the mobile device and network applications is suppressed. The step of suppressing data payload exchange may involve stopping the data transfer at the mobile device, at an application side, or via an intermediate network element by denying a network connection, dropping data packets or throttling network speed.

In an embodiment, the step of determining whether the current location of the mobile device is within the coverage area of the preferred network is executed by a network application. The network application can be configured to trigger the mobile device to perform a network re-scan by sending a cancel-location message to the mobile device. The cancel-location message can be in a form of SS7 Mobile Application Part (MAP) Cancel-Location message, Diameter Cancel-Location-Request, or Nudm_UECM_DeregistrationNotification.

In an embodiment, the SIM/eSIM module may be configured to switch from a first international mobile subscriber identity (IMSI) associated with the non-preferred telecommunications network to a second IMSI associated with the preferred telecommunications network.

This method can improve network efficiency and remove periodical network scanning that could interrupt ongoing connections.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

Embodiments of the present invention pertain to a method and a system for improving mobile network steering and traffic routing efficiency in geographic locations where the coverage area of a Private LTE network/5G network at least partially coincides with the coverage area of a Public Land Mobile Network (PLMN), such a 3G or 4G network.

In an embodiment depicted in FIG. 1, a mobile device 12 changes its location from a geographic area covered exclusively by a PLMN 14 to another geographic area in which both PLMN 14 and a Private LTE network 14 have coverage. PLMN 14 has at least one eNodeB 16. In addition, if PLMN 14 is a 2G/3G network, PLMN 14 will have the following nodes: a Mobile Switching Center (MSC) 18 and a Serving General Packet Radio Service (GPRS) Support Node (SGSN) 20. If PLMN 14 is an LTE network, then instead of MSC 18 and SGSN 20, PLMN 14 will have the following nodes: a Mobility Management Entity (MME) 18 and Serving Gateway (SGW) 20.

FIG. 1 further depicts a Private LTE/5G network 22. The geographic coverage area of Private LTE/5G network 22 at least partially overlaps the geographic coverage area of PLMN 14. Private LTE network 22 has the following nodes: MME 24 and SGW 26, while 5G network 22 has Access and Mobility Management Function (AMF) 54 and Session Management Function (SMF) 56.

Continuing reference to FIG. 1, Mobile Device 12 is a subscriber of Home Network 28. Home Network 28 can be a 2G/3G network, in which case, Home Network 28 will have the following nodes: Home Location Register 30 and Gateway GPRS Support Node (GGSN) 32. Alternatively, Home Network 28 can also be an LTE network, in which case, Home Network 28 will have the following nodes: Home Subscriber Server (HSS) 30 and Packet Gateway (PGW) 32. HLR/HSS 30 of Home Network 28 is in communication with MSC/MME 18 of PLMN 14 and, also, in communication with MME 24/AMF 56 of Private LTE network 22. Analogously, GGSN/PGW 32 of Home Network 28 is in communication with SGSN/SGW 20 of PLMN 14 and, also, in communication with SGW 26/SMF 56 of Private LTE/5G network 22. In an embodiment, GGSN/PGW 32 of Home Network 28 enables Mobile Device 12 to access Internet of Things (IoT) Applications 34 and/or the Internet 36.

Figure 2:
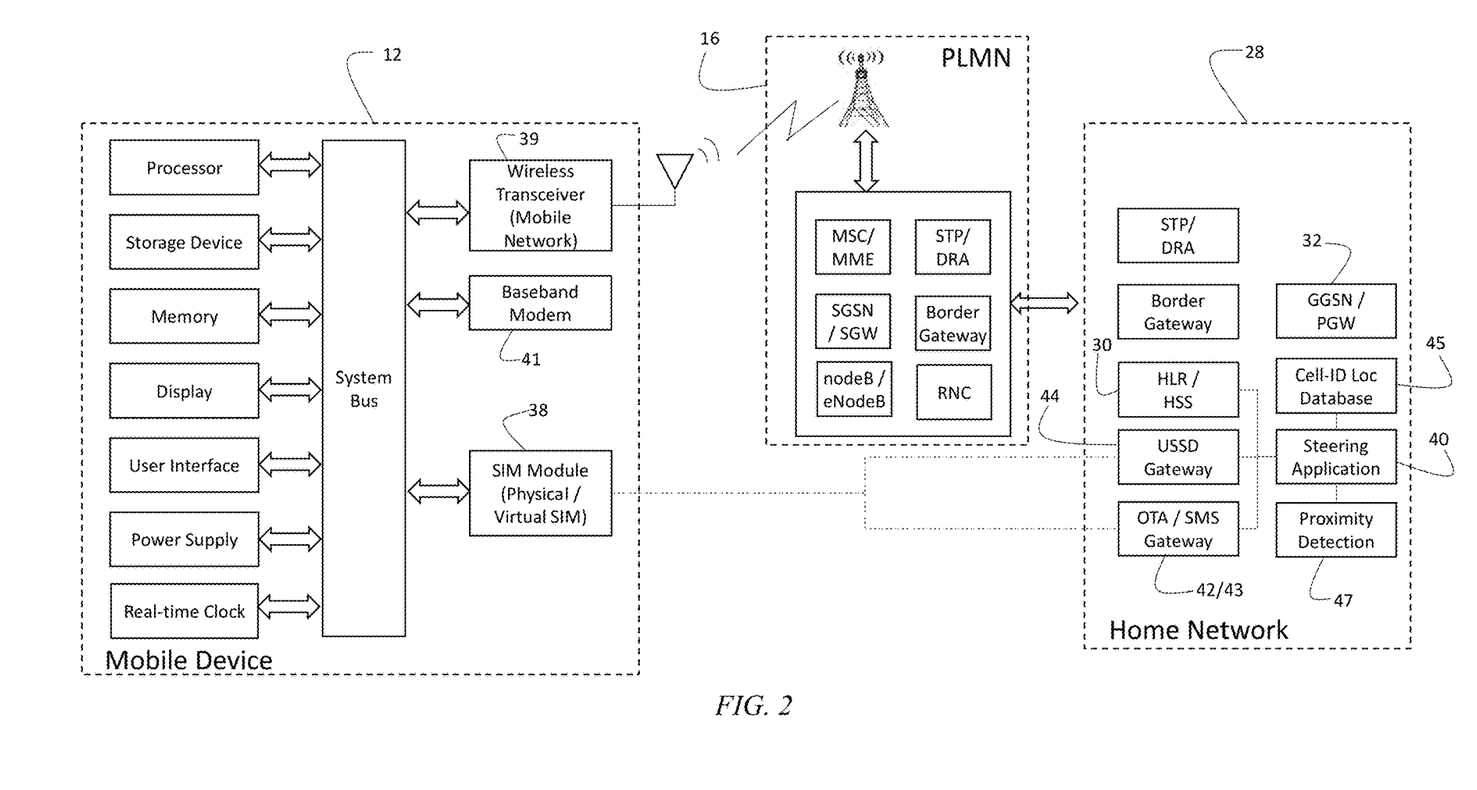
FIG. 2 is a diagram of exemplary system components of schematically depicting the components at both device and network sides to perform the network steering function.

FIG. 2 depicts Mobile Device 12 has a Subscriber Identity Module (SIM) 38 (or a virtual SIM 38) associated therewith. SIM/eSIM module 38 contains a list identifying mobile country codes (MCCs) and/or mobile network codes (MNCs) associated with preferred Private LTE/5G networks 22. In addition, mobile device 12 includes a wireless transceiver 39 and a baseband modem 41, which enable mobile device 12 to attach to either PLMN 14 or Private LTE/5G network 22.

SIM/eSIM module 38 is configured to request the mobile device 12 to periodically invoke a SIM Application Toolkit (STK) Applet. The STK Applet triggers the mobile device to collect the current network MNC, MCC, Cell-Id, adjacent cell, and/or radio strength value.

The STK Applet reports the collected MNC, MCC, Cell-Id, adjacent cell information, and/or radio strength value to the Steering Application 40 hosted at Home Network 28. These values can be reported via Unstructured Supplementary Service Data (USSD) Gateway 44. Based on the reported values, Steering Application 40 compares the reported values against the predefined values stored in database 45 associated with the coverage area of Private LTE/5G network 22. Based on the results of this comparison, Steering Application 40 determines whether the current location of mobile device 12 is within the coverage area of Private LTE/5G network 22. If Steering Application 40 determines that the current location of Mobile Device 12 is within the coverage area of Private LTE/5G network 22, then Steering Application 40 sends an over-the-air (OTA) message via OTA Gateway 43/Short Messaging System (SMS) Gateway 42 of Home Network 28 to SIM/eSIM module 38 of mobile device 12. The OTA message directs a SIM applet to invoke Mobile Device 12 to perform network steering to attach to Private LTE/5G network 22.

In an embodiment, Steering Application 40 may utilize a proximity detection function 47 to determine the distance between the current location of mobile device 12 and the coverage area of Private LTE/5G network 22. This distance and the estimated speed of movement of mobile device 12 can be used to forecast the time at which mobile device 12 will arrive into the coverage area of Private LTE/5G network 22. Steering Application 40 may be configured to trigger the steering command directing mobile device 12 to initiate the reattachment procedure at the forecasted time of arrival.

Figure 3:
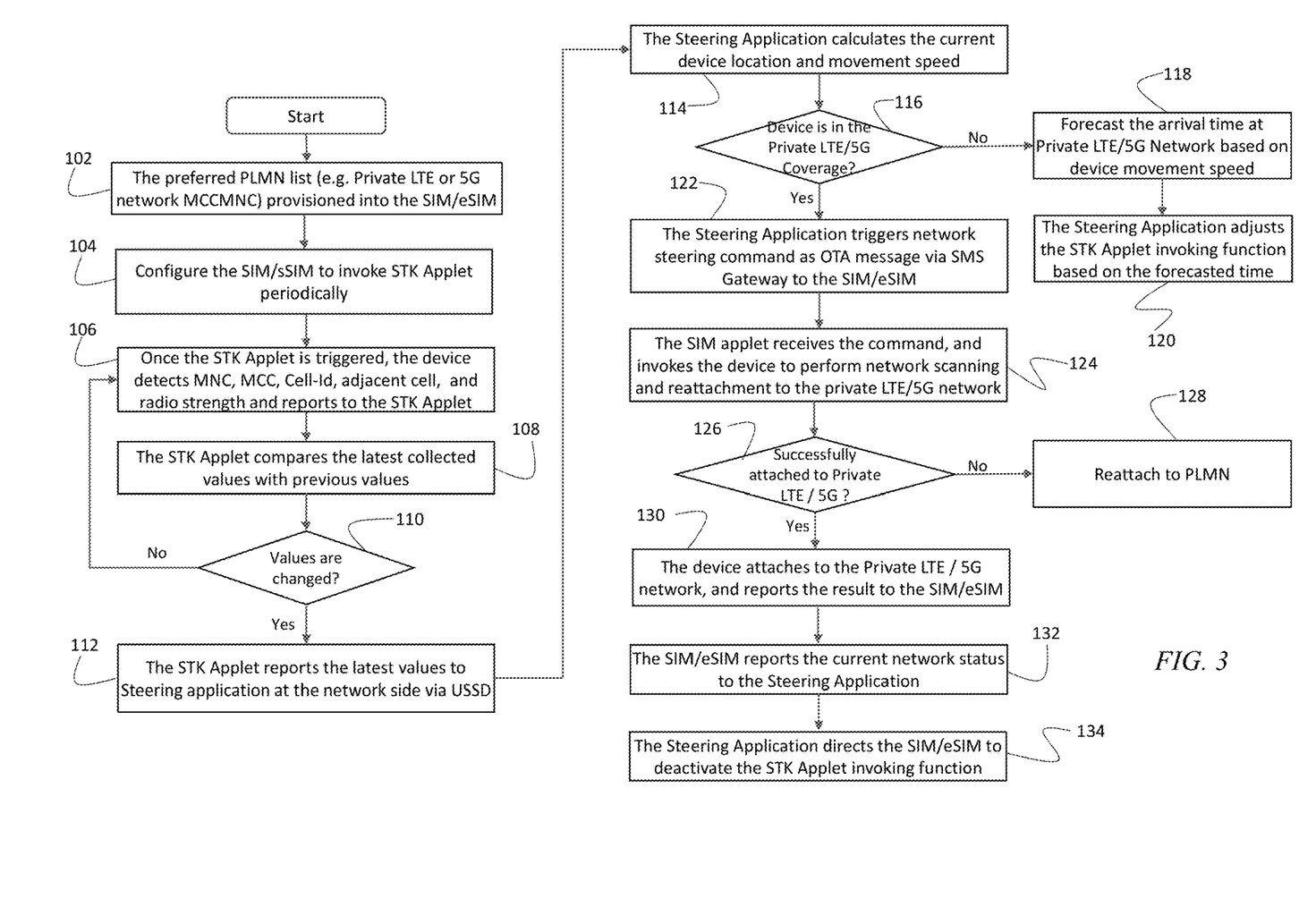
FIG. 3 is an exemplary process flow depicting the network steering process of one embodiment.

FIG. 3 provides a flowchart depicting the steps of the location identification and steering processes disclosed above. In step 102, a list of the preferred networks—e.g. Private LTE/5G networks 22—is provisioned onto SIM/eSIM module 38. This list may contain MCC/MNC associated with each preferred network. Next, in step 104, SIM/eSIM module 38 is configured to periodically invoke a preconfigured STK Applet. In step 106, the STK Applet causes mobile device 12 to collect and report MNC, MCC, Cell-ID, adjacent cell information, and/or radio signal strength associated with the current location of mobile device 12 to the STK Applet. In step 108, the STK Applet compares the currently reported values against previously reported values. Next, in step 110, if the STK Applet determines that the currently reported values and the previously reported values are the same, a determination is made that the location of mobile device 12 has not changed. In such case, STK Applet continues to monitor location of mobile device 12 by executing steps 106-110.

If, however, in step 110, it is determined that the reported MNC, MCC, Cell-ID, adjacent cell information, and/or radio signal strength values differ from the previously reported corresponding value, the method proceeds to step 112. In step 112, the STK Applet reports the most recent MNC, MCC, Cell-ID, adjacent cell information, and/or radio signal strength values to Steering Application 40 of Home Network 14 via Unstructured Supplementary Service Data (USSD) Gateway 44. In step 114, Steering Application 40 calculates the current location of mobile device 12 based on the most recent reported MNC, MCC, Cell-ID, adjacent cell information, and/or radio signal strength values. In addition, Steering Application 40 can use the calculated differences in the current and previously-reported MNC, MCC, Cell-ID, adjacent cell information, and/or radio signal strength values to estimate the speed and direction of movement of mobile device 12 (which becomes pertinent in step 118 described below).

Next, step 116 involves determining whether the current geographic location of mobile device 12 is within the coverage area of Private LTE/5G network 22. If it is determined that mobile device 12 is outside the coverage area of Private LTE/5G network 22, the method proceeds to step 118. Although steps 118 and 120 are optional, they provide several advantages. In step 118, Steering Application 40 calculates the movement speed of mobile device 12. Next, in step 120, the current location and the movement speed of mobile device 12 are used to forecast an estimated time at which mobile device 12 is expected to arrive within the coverage area of Private LTE/5G network 22. In step 120, the predicted arrival time of mobile device 12 into coverage area of Private LTE/5G network 22 can be used to dynamically adjust the time for invoking the STK Applet. The predicted arrival time is communicated to SIM/eSIM module 38 and is used to adjust the trigger time for the STK Applet in step 104. This functionality enables mobile device 12 to conserve resources when the steering function is not needed.

If, however, in step 116, it is determined that the current location of mobile device 12 is within the coverage area of Private LTE/5G network 22, the method proceeds to step 122. In step 122, Steering Application 40 triggers a network steering command as an OTA message to SIM/eSIM module 38 via SMS Gateway 42. Next, in step 124, responsive to receiving the OTA message, the STK applet invokes mobile device 12 to perform network scanning and reattachment to Private LTE/5G network 22. In step 126, the method verifies whether mobile device 12 has successfully attached to Private LTE/5G network 22. If it is determined that mobile device 12 failed to attach to Private LTE/5G network 22, the method proceeds to step 128, in which mobile device 12 reattaches back to PLMN 14.

Next, if in step 128, it has been determined that mobile device 12 has successfully attached to Private LTE/5G network, the method proceeds to step 130. In step 130, mobile device 12 reports the successful attachment result to SIM/eSIM module 38. Next, in step 132, SIM/eSIM module 38 reports the successful attachment result to Steering Application 40. In step 134, Steering Application 40 notifies SIM/eSIM module 38 to deactivate the STK Applet invoking function. In this manner, the STK Applet is deactivated when mobile device 12 is already attached to preferred Private LTE/5G network 22, thereby enabling mobile device 12 to conserve resources when the steering function is not needed. If mobile device 12 moves outside coverage area of Private LTE/5G network 22, mobile device 12 will attach to a non-preferred PLMN 14, the STK applet will be reactivated and the method described above will be reinitiated at step 104.

Figure 4:
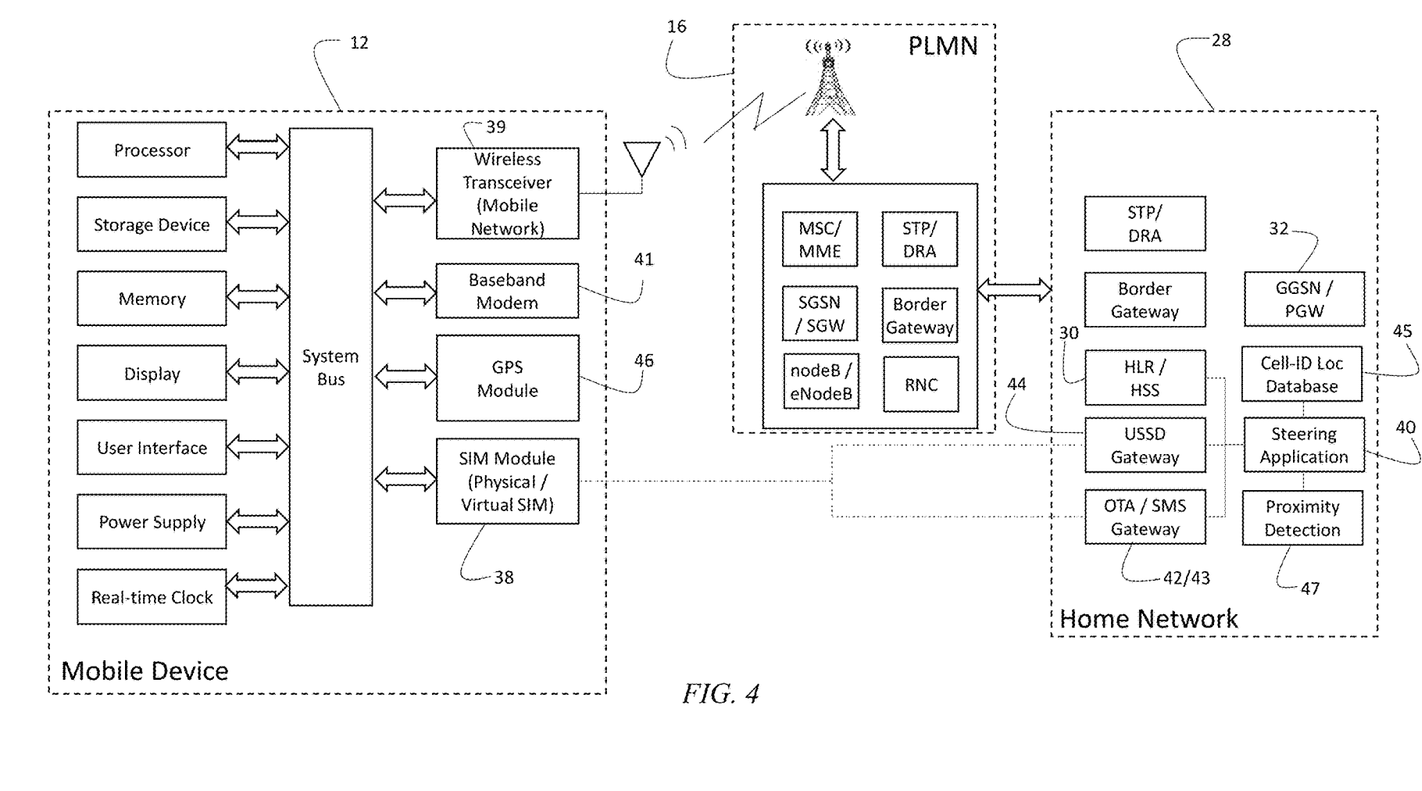
FIG. 4 is a diagram schematically depicting exemplary system components at both device and network sides to perform the network steering function with the addition of GPS module to provide periodical device location information.

FIG. 4 depicts an embodiment in which mobile device 12 is equipped with a GPS module 46. In this embodiment, GPS module 46 is used to periodically obtain longitude and latitude values corresponding to the current location of mobile device 12. When mobile device 12 is connected to non-preferred PLMN 14, GPS module 46 is actuated to periodically obtain the current GPS location of mobile device 12. The GPS coordinates are used to determine whether mobile device 12 has entered a geographic area having Private LTE/5G network 22 coverage. Upon positive confirmation, mobile device 12 notifies the STK applet with the latest GPS values, which are then reported to Steering Application 40 to trigger the network steering command. The GPS values can be reported over USSD signaling. Alternatively, the GPS values can be reported using HTTP/S over IP protocol, in which case, the GPS values are reported directly to Steering Application 40, instead of USSD protocol. GPS module 46 can be optionally deactivated when mobile device 12 is successfully attached to a Private LTE/5G network 22 to reduce resource consumption and conserve energy.

Figure 5:
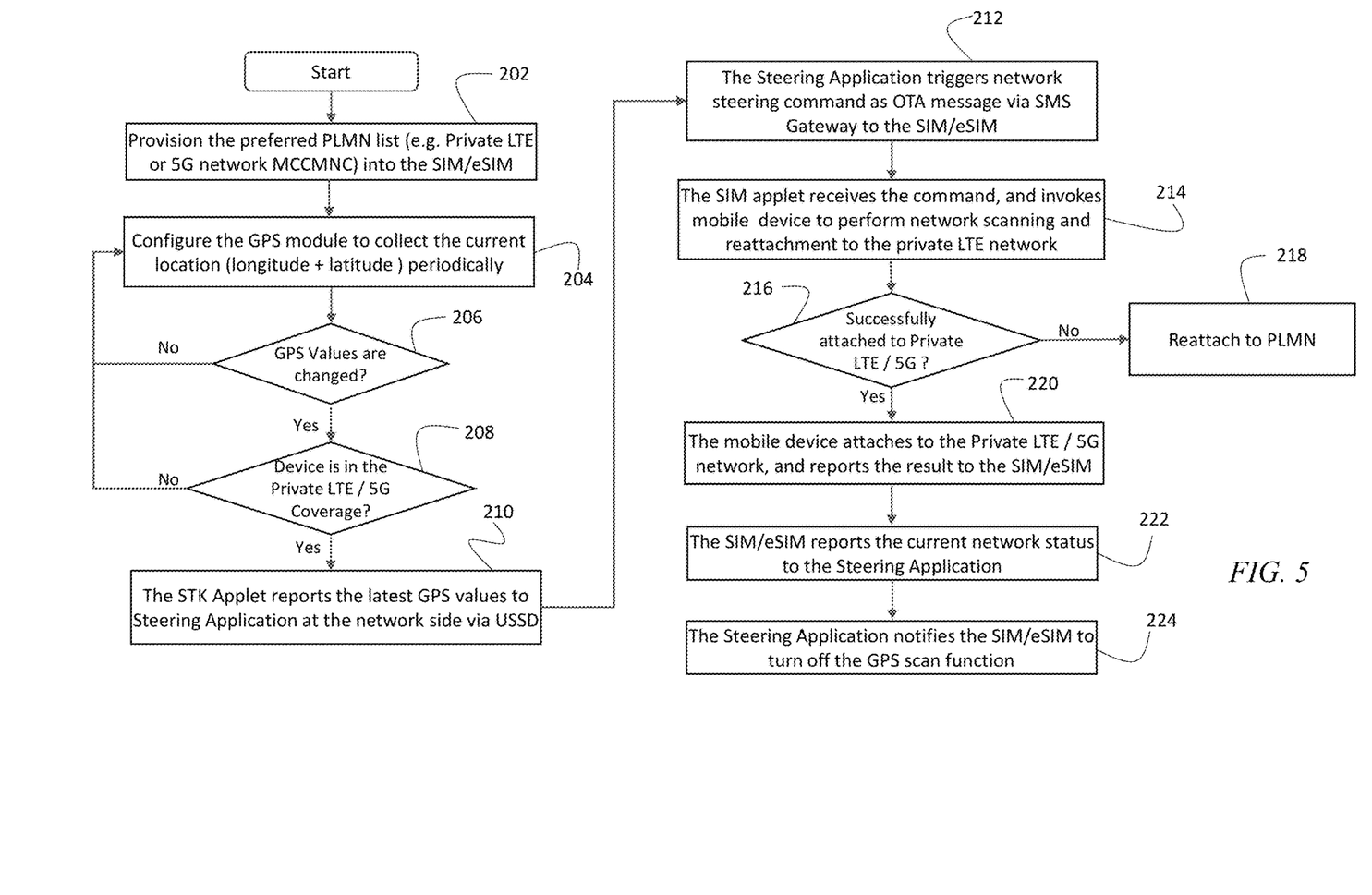
FIG. 5 is an exemplary process flow depicting the network steering process of one embodiment with the added GPS Module.

FIG. 5 provides a flowchart schematically illustrating the method of the embodiment depicted in FIG. 4. In step 202, a list of Private LTE/5G networks 22 is provisioned into the SIM/eSIM module 38. In step 204, GPS module 46 is configured to collect data—e.g., longitude and latitude coordinates—associated with a current location of mobile device 12. In step 206, it is determined whether data collected by GPS module 46 has changed relative to the previous location of mobile device 12. If GPS data has not changed, the method returns to step 204, and GPS module 46 continues to periodically obtain and provide data associated with the location of mobile device 12.

If, in step 206, it is determined that data obtained by GPS module 46 indicates that the location of mobile device 12 has changed, the method proceeds to step 208. In step 208, it is determined whether the current location of mobile device 12 is within the coverage area of Private LTE/5G network 22. If the current location of mobile device 12 is outside the coverage area of Private LTE/5G network 22, the method returns to step 204, and GPS module 46 continues to periodically collect and report data associated with a location of mobile device 12.

If step 208 leads to a determination that the current location of mobile device 12 is within a coverage area of Private LTE/5G network 22, the method proceeds to step 210. In step 210, the STK Applet reports the latest data provided by GPS module 36 to Steering Application 40. In step 212, Steering Application 40, network steering command as an OTA message via SMS Gateway 42. In step 214, STK Applet receives the steering command and invokes mobile device 12 to perform network scanning and reattachment to Private LTE/5G network.

In step 216, the method verifies whether mobile device 12 successfully attached to Private LTE/5G network 22. If it is determined that attachment was unsuccessful, mobile device 12 will reattach to PLMN 14. If, however, in step 216, it is determined that mobile device 12 has successfully attached to Private LTE/5G network 22, the method proceeds to step 220. In step 220, mobile device 12 reports the successful attachment result to SIM/eSIM module 38. In step 222, SIM/eSIM module 38 reports current network status indicating that mobile device 12 is attached to Private LTE/5G network 22 to Steering Application 40. In step 224, Steering Application 40 responds to SIM/eSIM module 38 with a command to deactivate the GPS scanning function.

Figure 6:
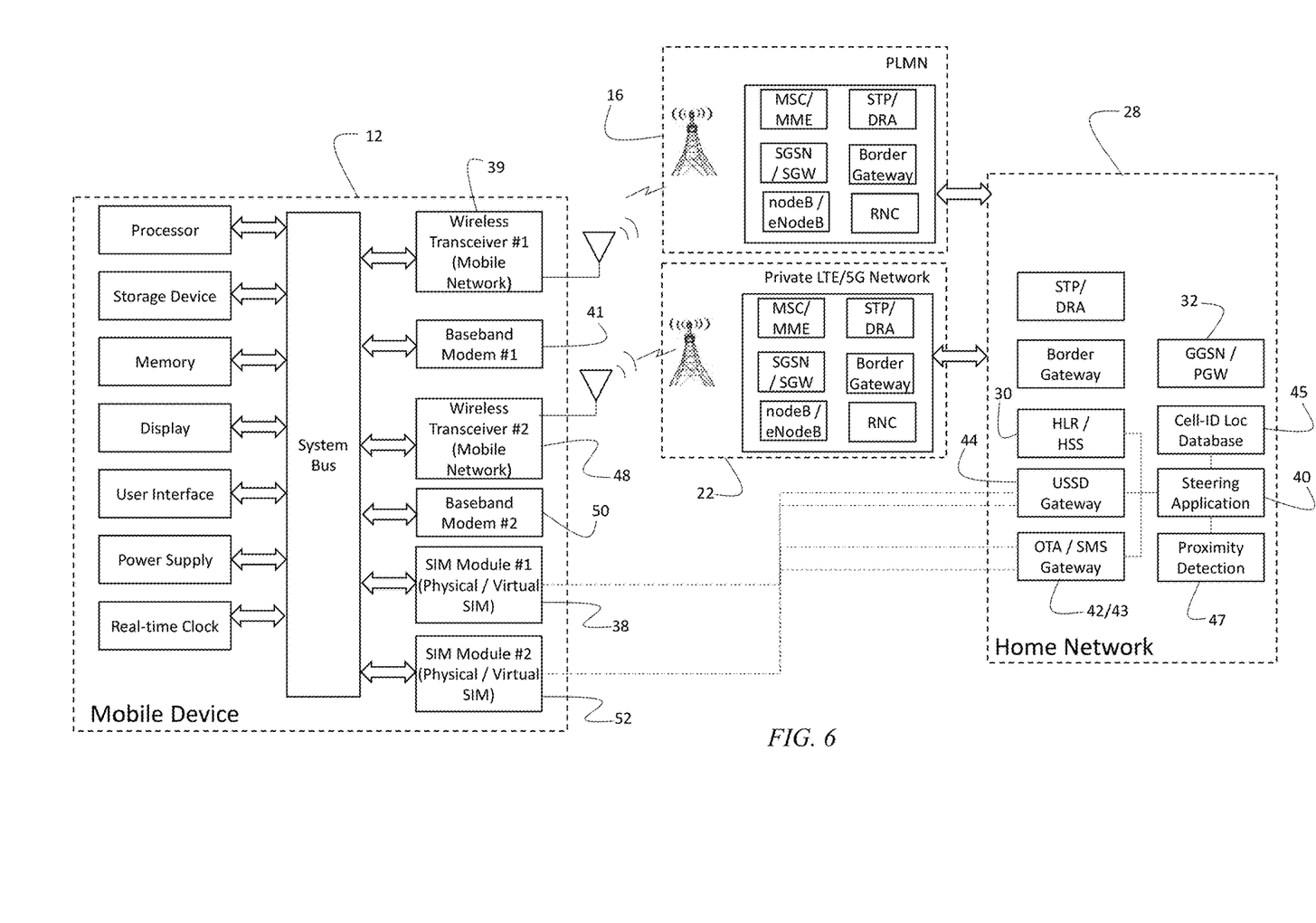
FIG. 6 is a diagram schematically depicting exemplary system components at both device and network sides to perform the network steering function with the addition of a second Wireless Transceiver and second SIM Module to perform the Private LTE/5G network detection.

The embodiment depicted in FIG. 6 pertains to a scenario in which mobile device 12 is equipped with a second wireless transceiver 48, a second baseband modem 50, and a second SIM/eSIM module 52. These components can be used to implement an alternative method for providing accurate detection of Private LTE/5G networks 22. In this embodiment, second wireless transceiver 48, second baseband modem 50, and second SIM/eSIM module 52 are used to periodically conduct complete network scan without interrupting mobile device's ongoing network connection via the first set of the wireless transceiver 39, baseband modem 41, and SIM/eSIM module 38. When the second set of the modules detects Private LTE/5G network 22 radio, the STK Applet on second SIM/eSIM module 52 reports this information to Steering Application 40. As discussed above the STK Applet can communicate information to Steering Application vis USSD messages or HTTP/S over IP protocol. In response, Steering Application 40 instructs the first set of modules—wireless transceiver 39, baseband modem 41, and SIM/eSIM module 36 to switch over to Private LTE/5G network 22.

In an embodiment, the second set of wireless transceiver 48, baseband modem 50, and SIM/eSIM module 52 is used to directly connect to a preferred Private LTE/5G network 22 and, then, notify Steering Application 40 (for example, via USSD messages) of the connection result. Responsive to a successful connection, Steering Application 40 instructs the first set of modules (wireless transceiver 39, baseband modem 41) to detach from PLMN 14 to which mobile device 12 is currently connected. At this point, the first set of modules is on stand-by, such that the first set of modules is ready to reconnect to another PLMN 14 after mobile device 12 travels outside of the coverage of Private LTE/5G network 22. This embodiment provides a more seamless user experience because there is no interruption of the underlying data connection.

Figure 7:
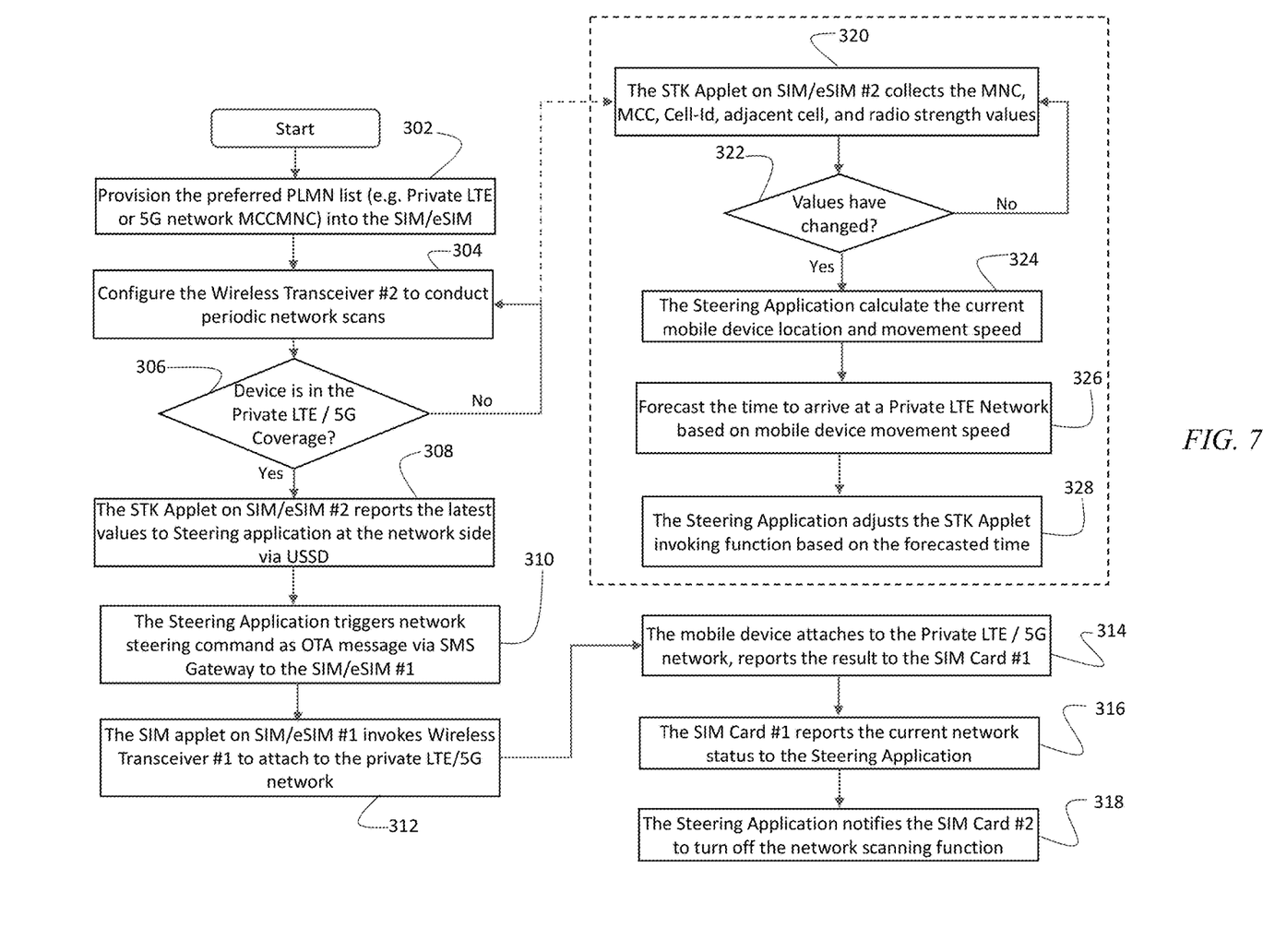
FIG. 7 is an exemplary process flow depicting the network steering process of one embodiment with the added GPS Module.

FIG. 7 provides a flowchart depicting a method according to which the embodiment depicted in FIG. 6 and described above operates. In step 302, a list of Private LTE/5G networks is provisioned into first SIM/eSIM module 38 and/or second SIM/eSIM module 52. In step 304, while first wireless transceiver 39 is connected to PLMN 14, second wireless transceiver 48 periodically conducts network scanning. If, in step 306, second wireless transceiver 48 detects network coverage of Private LTE/5G network 22, the method proceeds to step 308.

In step 308, the STK Applet on second SIM/eSIM module 52 reports to Steering Application 40 that mobile device 12 has entered an area having network coverage of Private LTE/5G network 22. In step 310, Steering Application 40 triggers network steering command as an OTA message via SMS Gateway 42 to first SIM/eSIM module 38. In step 312, a SIM Applet on first SIM/eSIM module 38 invokes first wireless transceiver 39 to attach to Private LTE/5G network 22. In step 314, mobile device 12 attaches to Private LTE/5G network 22 and reports the attachment result to first SIM/eSIM module 38. In step 316, first SIM/eSIM module 38 reports current network status to Steering Application 40. In step 318, Steering Application 40 instructs second SIM/eSIM module 52 to turn off the network scanning function.

Continuing reference to FIG. 7, the method of operation can be optionally configured to conserve resources by turning off the network scanning function until mobile device 12 is forecasted to enter into a coverage area of Private 5G/LTE Network. If, in step 306, it is determined that, mobile device 12 is currently outside of coverage area of Private 5G/LTE network 22, the method proceeds with one of the following options: (1) repeats step 304 by continuing to periodic network scans using second wireless transceiver 48 or (2) proceeds to step 320. In step 320, the STK Applet on second SIM/eSIM module 52 collects MNC, MCC, Cell-Id, adjacent cell information, and/or radio strength value. In step 322, the latest values are compared against previous values to determine whether mobile device 12 changed it location. If the MNC, MCC, Cell-Id, adjacent cell information, and/or radio strength values have not changed, the method returns to step 320, and STK Applet on second SIM/eSIM module 52 continues to collect these values.

If, in step 322, it is determined that the current MNC, MCC, Cell-Id, adjacent cell information, and/or radio strength values are different than previous values, the STK Applet on second SIM/eSIM 52 communicates at least the current and previous values to Steering Application 40. In step 324, Steering Application 40 determines current location and movement speed of mobile device 12. In step 326, based on current location and movement speed of mobile device 12, an estimated time of arrival into a coverage area of Private LTE/5G network 22 is forecasted. In step 328, Steering Application 40 sends an OTA command to first SIM/eSIM module 38 to set the time—which is the forecasted time of arrival—for mobile device 12 to initiate reattachment procedure to Private LTE/5G network 22.

Figure 8:
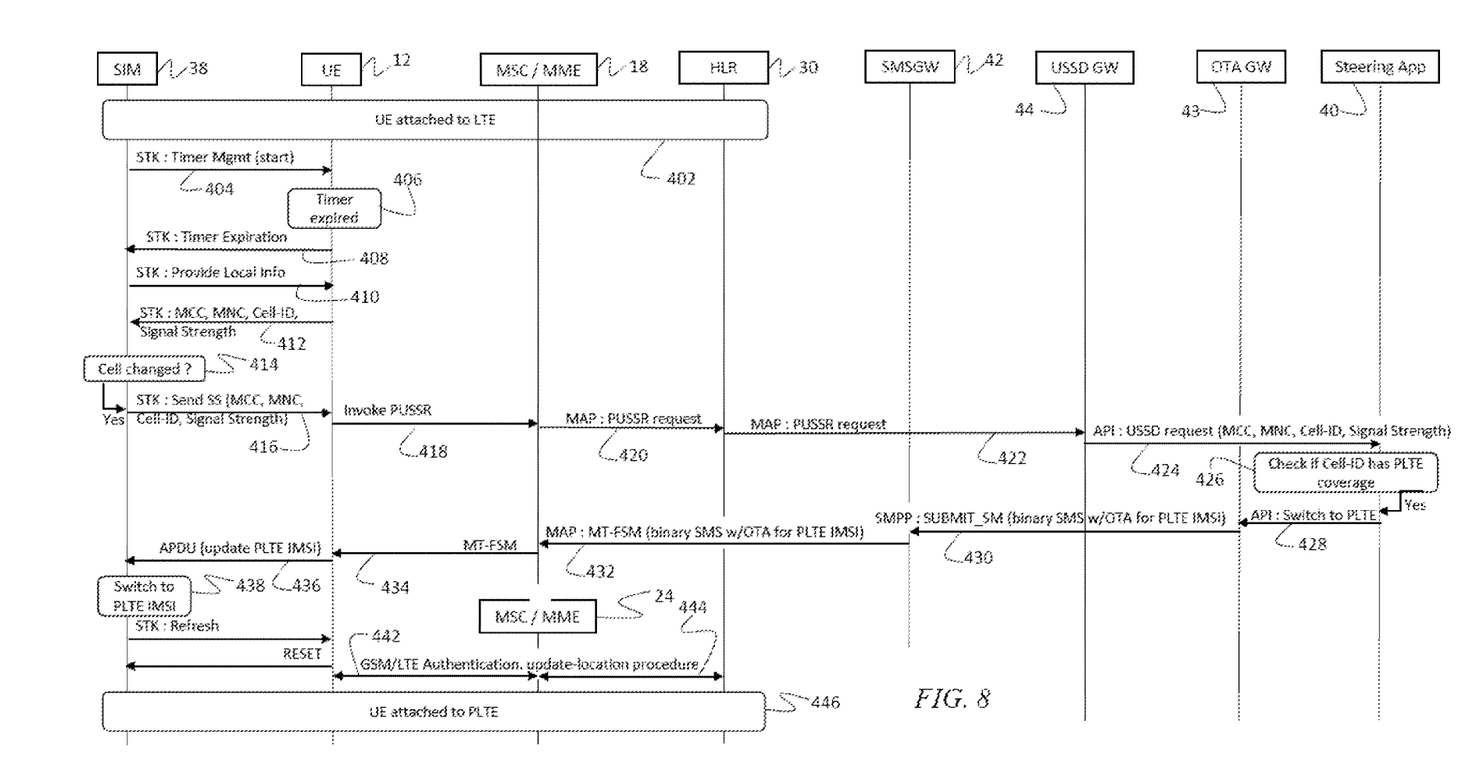
FIG. 8 is an exemplary call flow depicting the steering procedure occurred when device moves from PLMNs to Private LTE network.

FIG. 8 provides a signaling diagram for an embodiment of the invention in which mobile device 12 is steered from a PLMN 14, which is an LTE network, to a Private LTE 22. The method begins at step 402 with mobile device 12 (UE) attached to PLMN 14. Next, in steps 404-412, the STK Applet on SIM/eSIM module 38 and mobile device 12 communicate with one another to obtain MNC, MCC, Cell-Id, adjacent cell information, and/or radio strength values. Specifically, in step 404, the STK Apple initiates a time management query toward mobile device 12. In step 406, mobile device 12 waits for expiration of a predefined time duration. In step 408, mobile device 12 notifies the STK Applet that the predefined time has elapsed. In response, in step 410, the STK Applet issues a request to mobile device 12 to provide MNC, MCC, Cell-Id, adjacent cell information, and/or radio strength values. In step 412, mobile device 12 responds to the STK Applet with the requested values.

In step 414, the STK Applet determines whether the most recent MNC, MCC, Cell-Id, adjacent cell information, and/or radio strength values ("values") are different from those previously received. As discussed above, a change in these values indicates that mobile device 12 has changed its location with respect to the location at which previous values were recorded. To determine whether the new location of mobile device 12 is within a coverage area of Private LTE network 22, the STK Applet send the MNC, MCC, Cell-Id, adjacent cell information, and/or radio strength values to Steering Application 40.

In step 416, the STK Applet sends a supplementary string (SS) with the most recent MNC, MCC, Cell-Id, adjacent cell information, and/or radio strength values to mobile device 12. In step 418, mobile device 12 invokes a process unstructured SS request (PUSSR) toward MSC/MME 18. In step 420, MSC/MME 18 sends a mobile application part (MAP) PUSSR request to HLR 30. In step 422, HLR 30 send the MAP PUSSR request to USSD Gateway 44. In step 424, USSD Gateway 44 sends an application programming interface (API) USSD request to Steering Application 40, thus providing MNC, MCC, Cell-Id, adjacent cell information, and/or radio strength values to Steering Application 40.

In step 426, Steering Application 40 determines whether location associated with the MNC, MCC, Cell-Id, adjacent cell information, and/or radio strength values corresponds to a coverage area of Private LTE 22. If yes, then in step 428, Steering Application 40 issues an API command to an OTA Gateway 43 directing a switch to Private LTE network 22. In step 430, OTA Gateway 43 transmits a short message peer-to-peer (SMPP) to SMS Gateway 42. In step 432, SMS Gateway 42 transmits a MAP: mobile terminated (MT) forward short message (FSM) message to MSC/MME 18. In step 434, MSC/MME 18 sends MT-FSM to mobile device 12. In step 436, mobile device sends an application protocol data unit (APDU) to SIM/eSIM module 38, causing SIM/eSIM module 38 to switch to international mobile subscriber identity (IMSI) configured for connection to Private LTE network 22. If the current IMSI in the SIM/eSIM module 38 is permitted to connect to the Private LTE/5G network 22, then the APDU needs only to include the command instructing the current IMSI to connect to the Private LTE/5G network 22. In step 438, SIM/eSIM module 38 executes the switch. In steps 442 and 444, authentication and update-location procedures take place. Finally, in step 446, mobile device 446 is successfully attached to Private LTE network 22.

Figure 9:
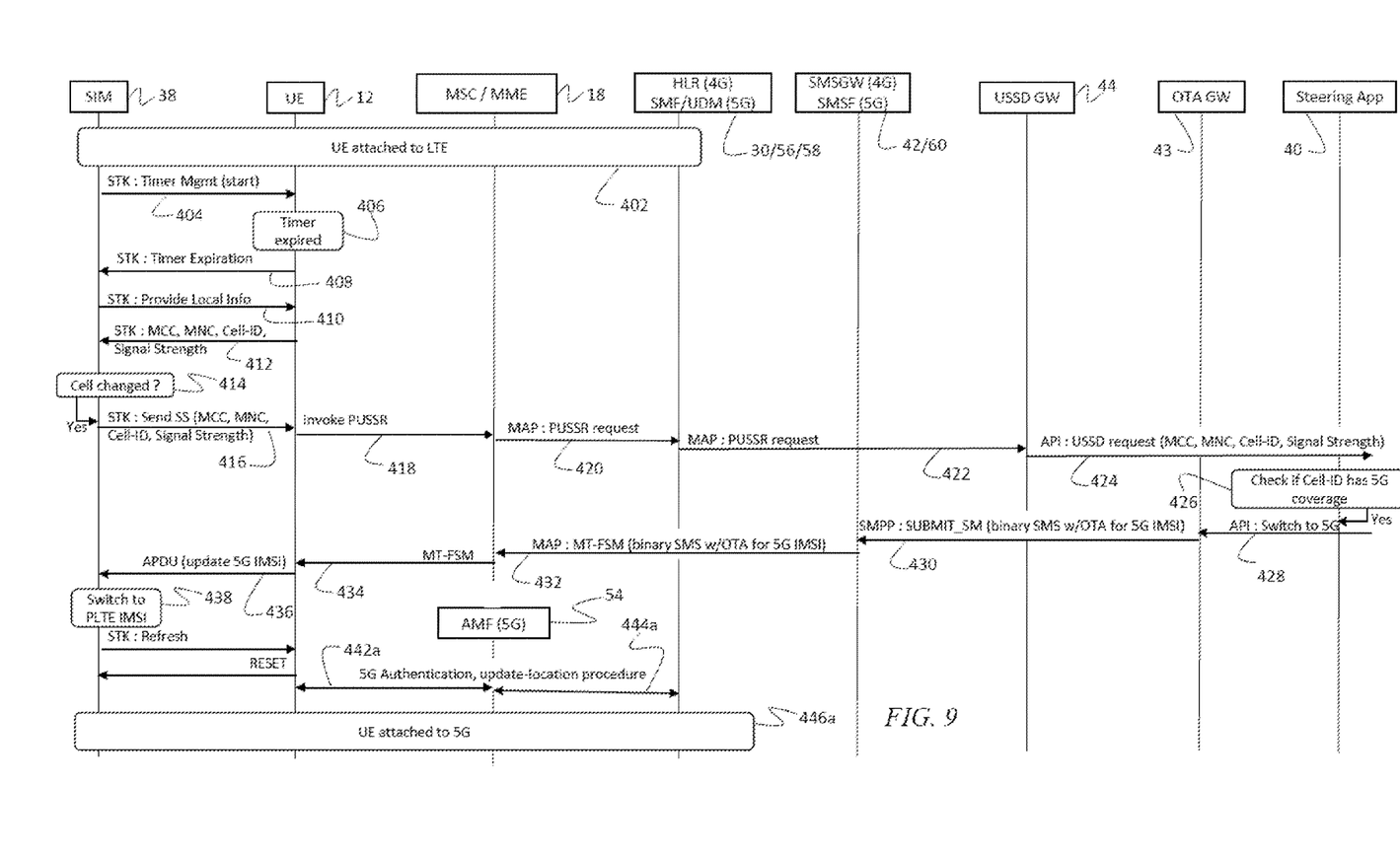
FIG. 9 is an exemplary call flow depicting the steering procedure occurred when device moves from PLMNs to 5G network.

FIG. 9 depicts a signaling diagram for steering mobile device 12 from PLMN 14 to 5G network 22. The signaling diagram of FIG. 9 is analogous to the signaling diagram of FIG. 8. The main difference between these two signaling diagrams pertains to authentication and update-location procures. In the signaling diagram of FIG. 9, in steps 442a-446a, mobile device 12 communicates with the 5G components, specifically Access and Mobility Management Function (AMF) 54, Session Management Function (SMF) 56, and/or Unified Data Management (UDM) 58 to attach to 5G network 24.

Figure 10:
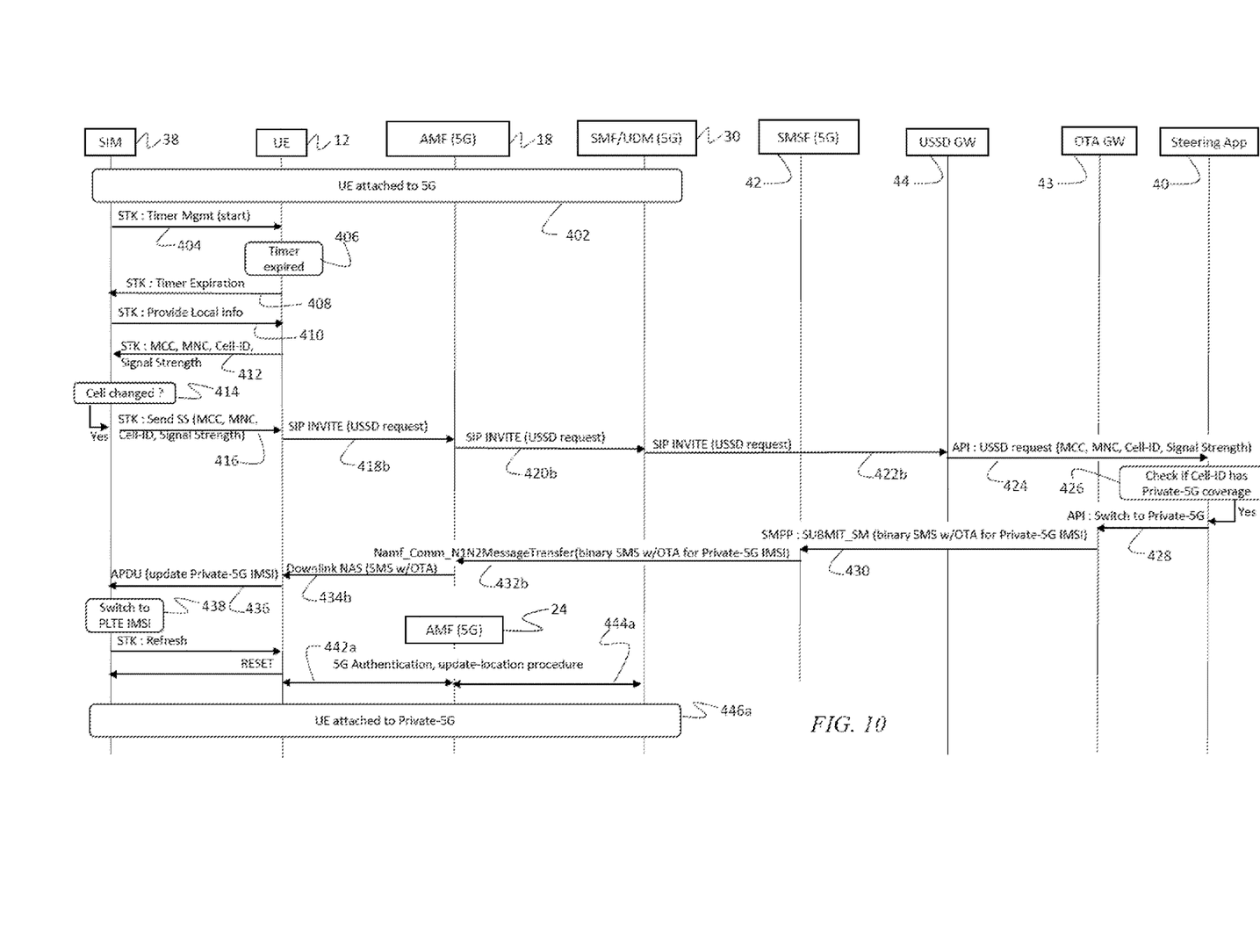
FIG. 10 is an exemplary call flow depicting the steering procedure occurred when device moves from 5G networks to private 5G networks.

FIG. 10 depicts a signaling diagram for steering mobile device 12 from a non-preferred 5G network to a preferred/private 5G network 22. This method differs from the methods depicted in FIGS. 8 and 9, in the path of communications between mobile device 12 and Steering Application 40. Specifically, instead of using MAP messages, mobile device 12 communicates MNC, MCC, Cell-Id, adjacent cell information, and/or radio strength values to Steering Application 40 using a Session Initiation Protocol (SIP) INVITE messaging. In step 418*b*, mobile device 12 sends SIP INVITE message toward AMF 54. In step 420*b*, AMF 54 sends the SIP INVITE message to SMF/UDM 56/58, and, in step 422*b*, SMF/UDM 56/58 sends the SIP INVITE to USSD Gateway 44. When Steering Application 40 responds to mobile device 12, Short Message Service Function (SMSF) 60 sends a Namf Communication message to AMF 54 in step 432*b* (instead of MAP message from SMS Gateway 42 to MSC/MME in FIGS. 8 and 9). In step 434*b*, AMF 54 sends a downlink Non-Access Stratum (NAS) message to mobile device 12, which causes mobile device 12 to instruct SIM/eSIM module 38 to switch to IMSI associated with private 5G network. The method concludes with the steps 442*a*-446*a*, which are the same as those discussed above in relation to FIG. 9.

Hardware and Software Infrastructure Examples

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of steering a mobile device to a preferred telecommunications network having a first coverage area at least partially coinciding with a second coverage area of a non-preferred telecommunications network, the method comprising:
provisioning a list containing identification information of the preferred telecommunications network on a Subscriber Identity Module (SIM) card or a virtual SIM module;
issuing a command directing the mobile device to collect a set of values for attributes associated with a current location of the mobile device;
accessing a set of prestored attribute values defining the first coverage area of the preferred network;
determining whether the current location of the mobile device is within the first coverage area of the preferred telecommunications network by comparing the set of values for attributes associated with the current location of the mobile device against one or more values of the set of prestored attribute values defining the first coverage area of the preferred network, wherein the step of determining whether the current location of the mobile device is within the first coverage area of the preferred network is executed by a network application;
responsive to determining that the current location of the mobile device is within the first coverage area of the preferred network, triggering a steering command directing the mobile device to perform a network selection procedure based on the list containing the identification information of the preferred telecommunications network, wherein the network application is configured to send a cancel-location message to the mobile device, thereby triggering the mobile device to perform a network rescanning procedure; and
wherein, responsive to successfully attaching to the preferred telecommunications network, the mobile device is configured to send a confirmation that the mobile device is registered with the preferred telecommunications network.

2. The method of claim 1, wherein the command directing the mobile device to collect the set of values for attributes associated with the current location of the mobile device is issued periodically based on a predefined time period.

3. The method of claim 2, wherein responsive to the confirmation that the mobile device is registered with the preferred network, the mobile device stops collecting and reporting the set of values for attributes associated with the current location of the mobile device.

4. The method of claim 1, further comprising responsive to the confirmation that the mobile device is registered with the preferred network, triggering the mobile device or a network application to initiate data exchange.

5. The method of claim 1, further comprising the step of calculating an expected time of arrival of the mobile device into the first coverage area of the preferred network.

6. The method of claim 5, wherein the expected time of arrival of the mobile device is calculated based on a distance between the current location of the mobile device and the first coverage area of the preferred network and a movement speed of the mobile device.

7. The method of claim 5, wherein the steering command is triggered at the expected time of arrival of the mobile device into the first coverage area of the preferred network.

8. The method of claim 1, wherein the preferred network is a Private Long Term Evolution (LTE) network, a 5G network, or a Private 5G network.

9. The method of claim 1, wherein the set of values for attributes associated with the current location of the mobile device is selected from the group consisting of a longitude, a latitude, a Mobile Country Code (MCC), Mobile Network Code (MNC), cell identification, adjacent cell information, radio signal quality, and radio signal strength.

10. The method of claim 1, wherein the command directing the mobile device to collect the set of values for attributes associated with the current location of the mobile device is issued by an application in a form of a software running on the mobile device or an applet running on an operating system of the SIM card or the virtual SIM module.

11. The method of claim 1, wherein the set of values for attributes associated with the current location of the mobile device is reported via Signaling System No. 7 (SS7), Diameter, General Packet Radio Service Tunneling Protocol (GTP), HyperText Transfer Protocol (HTTP)/2 signaling protocol, Internet Transmission Control Protocol (TCP)/Internet Protocol (IP) protocol.

12. The method of claim 1, wherein responsive to the mobile device leaving the first coverage area of the preferred network, data payload exchange between the mobile device and network applications is suppressed.

13. The method of claim 12, wherein the data payload exchange is suppressed by stopping data transfer at the mobile device, at an application side, or via an intermediate network element by denying a network connection, dropping data packets or throttling network speed.

14. The method of claim 1, wherein the steering command is triggered by a network application, the network application being a software program deployed at a network node.

15. The method of claim 1, wherein the cancel-location message is in a form of SS7 Mobile Application Part (MAP) Cancel-Location message, Diameter Cancel-Location-Request, or Nudm_UECM_DeregistrationNotification.

16. The method of claim 1, wherein the SIM card or the virtual SIM module is configured to switch from a first international mobile subscriber identity (IMSI) associated with the non-preferred telecommunications network to a second IMSI associated with the preferred telecommunications network.

* * * * *